United States Patent Office 2,762,790
Patented Sept. 11, 1956

2,762,790
POLYMERIZATION OF ALIPHATIC CONJUGATED DIOLEFINS

Charles R. Greene, Park Forest, Ill., assignor to Standard Oil Company, Chicago, Ill., a corporation of Indiana No Drawing. Application December 26, 1952,
Serial No. 328,139

15 Claims. (Cl. 260—82.5)

This invention relates to a novel polymerization process and to novel polymerization products produced thereby. In a more specific aspect, this invention relates to a process for the polymerization of aliphatic conjugated diolefins in the presence of a hydride of an alkaline earth metal and a catalyst comprising essentially an oxide of a metal of group 6a of the Mendeleef periodic table, viz. one or more of the oxides of chromium, molybdenum, tungsten or uranium.

One object of my invention is to provide combinations of novel metal oxide catalysts and metal hydride catalyst promoters for use in the preparation of polymers, especially high molecular weight normally solid polymers, from monomeric charging stocks comprising essentially an aliphatic conjugated diolefin. Another object is to provide a new and practical process for the polymerization of aliphatic conjugated diolefins, particularly 1,3-butadiene and certain derivatives thereof, to high molecular weight, solid, elastic polymers characterized by the presence of a predominant proportion of 1,4-linked, cis-configurational monomer units. An additional object of my invention is to provide metal hydride promoters which substantially increase the yield of polymer which can be obtained by polymerization of an aliphatic conjugated diolefin in the presence of a catalyst comprising essentially an oxide of a metal of group 6a of the Mendeleef periodic table. Yet another object is to provide novel processes for the copolymerization of aliphatic conjugated diolefins with each other or, in general, with other copolymerizable compounds. One more object is to provide novel polymerization products.

Briefly, the inventive process comprises contacting a polymerization charging stock comprising essentially one or more aliphatic conjugated diolefins with the hydride of an alkaline earth metal and with a catalyst comprising essentially one or more of the oxides of chromium, molybdenum, tungsten, or uranium, for example, a partially reduced molybdenum trioxide catalyst extended upon a difficultly reducible metal oxide support. The inventive process is effected at temperatures between about 100° C. and about 300° C., more often between about 150° C. and 250° C., preferably between about 175° C. and about 230° C. The reaction pressures can be varied between about atmospheric and 15,000 p. s. i. g. or higher, preferably between about 200 and 1000, or about 500 to 800 p. s. i. g. When normally solid materials are produced by the catalytic conversion, they tend to accumulate upon and within the solid catalyst. It is desirable to supply to the reaction zone a liquid medium which serves both as a reaction medium and a solvent for reaction products. Suitable liquid reaction media include various hydrocarbons, particularly an aromatic hydrocarbon such as benzene, toluene or xylenes; however, the conversion of aliphatic conjugated diolefins can be effected in the absence of a liquid reaction medium or solvent and the catalyst containing accumulated polymeric products can be treated from time to time, within or outside the conversion zone, to effect removal of polymeric products therefrom and, if necessary, reactivation or regeneration of the catalyst for further use.

As catalyst promotors, there may be used one or more of the hydrides of beryllium, magnesium, calcium, strontium and barium. Based on considerations of availability, cheapness and overall efficiency calcium hydride is the preferred promoter for use in the process of the present invention. The proportion of metal hydride to metal oxide catalyst (total weight) can be varied between about 0.1 and about 5 parts by weight, more often between about 0.2 and about 1 part by weight.

The employment of calcium hydride or its equivalents in the reaction zone has numerous important practical consequences, as compared to processes wherein said metal oxide catalysts are employed alone. Thus, in the presence of both calcium hydride and metal oxide catalyst, high yields of solid polymers can be obtained from aliphatic conjugated diolefins, particularly hydrocarbons such as 1,3 butadiene, the hydride-oxide catalyst combination can function well in the presence of large proportions of liquid reaction medium, the catalysts retain strong polymerization activity for a long period of time (long catalyst life), polymers having desirable ranges of physical and chemical properties can be readily produced by controlling the reaction variables, etc., as will appear from the detailed description and operating examples which follow.

The function or functions of the metal hydride in my process are not well understood. Thus, neither molybdenum nor calcium hydride alone function as catalysts for the polymerization of 1,3-butadiene under the conditions described herein, as will appear in more detail hereinafter; yet the combination of these reagents constitutes an efficient catalyst for the polymerization of aliphatic conjugated diolefins to novel polymers.

The oxide of a metal of group 6a of the Mendeleef periodic table can be of the type heretofore employed for effecting hydroforming, the word "hydroforming" being employed to mean processes of the type described in United States Letters Patent 2,320,147, 2,388,536, 2,357,332, etc. It is ordinarily preferred to employ the group 6a metal oxides extended or dispersed upon a suitable support usually a difficultly reducible metal oxide such as gamma-alumina, titania, zirconia, silica gel, kieselguhr, diatomite, various aluminosilicates such as aluminasilica gels prepared from the hydrous oxides (e. g. 10 w. percent $Al_2O_3$ on $SiO_2$ gel), alumina-silica-zirconia gels, acid-activated clays and bleaching earths, etc. The relative proportions of support to the catalytic metal oxide is not critical and may be varied throughout a relatively wide range such that each component is present in amounts of at least approximately 1 weight percent. The usual metal oxide-support ratios are in the range of about 1:20 to 1:1, or approximately 1:10. I can employ conditioned alumina-metal oxide catalysts composed of gamma-alumina base containing about 1 to 80%, preferably about 5 to 35%, or approximately 10%, of group 6a metal oxide supported thereon.

Gamma-alumina, titania and zirconia supports for my catalysts may be prepared in any known manner and the oxides of molybdenum or other group 6a metal may likewise be incorporated in, or deposited on, the support in any known manner, e. g. as described in copending Serial No. 223,641 of Alex Zletz and Serial No. 223,643 of Alan K. Roebuck and Alex Zletz, both filed on April 28, 1951, now U. S. Patents 2,692,257 and 2,692,258, respectively.

The molybdena or other molybdenum-oxygen compound, such as cobalt molybdate, may be incorporated in the catalyst base in any known manner, e. g. by impregnation, coprecipitation, co-gelling, and/or absorption, and the catalyst base and/or finished catalyst may be heat stabilized by methods heretofore employed in the preparation of hydroforming or hydrofining catalysts. Cobalt molybdate catalysts may be prepared as described in U. S. 2,393,288, 2,486,361, etc. Cobalt, calcium, nickel and copper salts of chromic, tungstic and uranic acids may also be employed with or without a support.

The catalyst may be stabilized with silica (U. S. 2,437,532–3) or with aluminum ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531–2). Oxides of other metals such as magnesium, nickel, zinc, vanadium, thorium, iron, etc., may be present in minor amounts, below 10 weight percent of the total catalyst.

Although no pre-reducing treatment need be effected on the metal oxide catalysts when they are employed in the presence of the metal hydrides, a reducing or conditioning treatment is preferred in commercial processing. The conditioning or reducing treatment of the hexavalent group 6a metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p. s. i. g., or even more. The simplest reducing operation may be effected with hydrogen at about atmospheric pressure.

The partial reduction of the metal oxide catalyst in which the metal is present in its hexavalent state can be effected in the presence of the metal hydride promoter, prior to contacting the combination of catalysts with the charging stock containing an aliphatic conjugated diolefin. An induction period which sometimes occurs before polymerization can be eliminated or substantially reduced by pressuring hydrogen into the reactor containing the solvent, diolefin, metal oxide catalyst and metal hydride, e. g. at hydrogen pressures between about 10 and about 900 p. s. i. g., preferably 100–400 p. s. i. g.

Lithium aluminum hydride, an exceptionally active reducing agent, conditions and activates catalysts containing hexavalent group 6a metal oxides even at temperatures as low as 35° C., although in general temperatures between about 100 and about 300° C. can be employed. In practice, for example, a catalyst containing free or chemically combined $MoO_3$ (e. g., combined as in $CoMoO_4$) is treated with a suspension of $LiAlH_4$ in a liquid hydrocarbon at weight ratios of about 0.2 to about 1 $LiAlH_4$ per weight of solid catalyst. Sodium hydride (or sodium plus $H_2$) is effective in reducing and conditioning hexavalent group 6a metal oxide catalysts such as $MoO_3$ at temperatures above about 180° C. and can be employed in the same proportions as $LiAlH_4$.

The conditioning and reducing treatment of the group 6a metal oxide can be followed and controlled by analysis with ceric sulfate-sulfuric acid solution, by means of which the average valence state of the molybdenum or other metal oxide in the catalyst can be accurately determined. In determining the average valence state of metals such as molybdenum in catalysts such as partially reduced $MoO_3$ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists in weighing out approximately one gram of finely-ground, freshly-reduced catalyst into a glass-stoppered 250-ml. Erlenmeyer flask and adding 25 ml. of 0.1 N ceric sulfate solution and 25 ml. of 1:1 sulfuric acid. This mixture is allowed to stand at room temperature for four days with frequent agitation. This interval was arbitrarily chosen intially but was later shown to be more than sufficient time for the oxidation to take place. The solid residue is then filtered off and the excess ceric solution determined by addition of excess standard ferrous solution which is in turn titrated with standard ceric solution using ferrous-ortho-phenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standard ceric sulfate solution. From the values obtained, the oxidation state of molybdenum can be determined.

The partial reduction of the group 6a metal trioxide is carried out to the extent that the average valence state of the metal in the finished catalyst lies within the range of about 2 to about 5.5, preferably between about 3 and about 5.

The polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salts or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalysts can be employed in various forms and sizes, e. g. as powder, granules, microspheres, broken filter cake, lumps, or shaped pellets. A convenient form in which the catalysts may be employed is as granules of about 20–100 mesh/inch size range.

The aliphatic conjugated diolefins employed in charging stocks to the present process comprise aliphatic conjugated diolefinic hydrocarbons, examples of which include 1,3-butadiene, isoprene, 2,3-dimethyl butadiene, piperylene, 2-phenyl-1,3-butadiene, 4-methyl-1,3-pentadiene, cyclopentadiene, various alkyl cyclopentadienes (particularly methylcyclopentadienes), fulvene, 1,3-cyclohexadiene, various methyl derivatives of 1,3-cyclohexadiene, 1,4-divinylbenzene and the like. The process of the present invention is applicable also to various derivatives of aliphatic conjugated diolefinic hydrocarbons, particularly the 2-halogen derivatives, viz. 2-chloro-1,3-butadiene, 2-bromo-1,3-butadiene and 2-fluoro-1,3-butadiene. The present invention is, likewise, applicable to the polymerization of perfluorinated aliphatic conjugated diolefins and the like, including perfluorobutadiene, perfluoroisoprene and similar compounds such as 2-chloropentafluoro-1,3-butadiene.

It is sometimes desired to vary the properties of the homopolymers of aliphatic conjugated diolefins by effecting copolymerization of the aliphatic conjugated diolefins with one or more comonomeric compounds capable of addition polymerization. Many classes, and individual members thereof, of such comonomers can be employed in the process of the present invention. Thus, the charging stock to the present polymerization process may comprise from about 10 to about 90 weight percent of aliphatic conjugated diolefin, the remainder being a comonomer.

One suitable class of co-monomers consists of monoolefinic hydrocarbons, particularly normally gaseous members of this class, such as ethylene, propylene, n-butenes and isobutene; t-butylethylene.

Polyolefinic hydrocarbon co-monomers can be used, for example, 2-methyl-1,4-pentadiene, 4-vinylcyclohexene, 1,3,5-hexatriene, 2,5-dimethyl-1,5-hexadiene and various cyclic or acyclic terpenes, such as dipentene, pinene, myrcene, allo-ocimene, etc.

A wide variety of other co-monomers may be employed, characterized, in general, by the structural formula >C=C<, wherein at least one of the valence bonds is linked to a negative group and the remaining valence bonds are linked to hydrogen or hydrocarbon groups, said co-monomer being capable of copolymerization with an aliphatic conjugated diolefin. Numerous subclasses of such co-monomers containing at least one negative group are known and an extensive resins, plastics and elastomer art has developed about the copolymerization and homopolymerization of said co-monomers.

The subgroups of co-monomers may be conveniently classified according to the nature of the negative group contained within compounds of the above generic formula. A brief exemplification of some of the outstanding co-monomer subgroups and species is given hereinafter. The negative group may be:

(1) Halogen: for example, as in vinyl chloride, vinylidene chloride, vinyl bromide, perfluoroethylene, chlorotrifluoroethylene and 3,3,3-trifluoro-1-propene, perfluoropropene.

(2) Aryl: styrene, alpha-methyl styrene, various nuclearly chlorinated styrenes, p-methoxy styrene, 3-methyl styrene, 4-methyl styrene, 3,4-dimethyl styrene, 3,5-dimethyl styrene, 3,4,5-trimethyl styrene, p-divinylbenzene and stilbene.

(3) Acyloxy: vinyl acetate, vinyl propionate, vinyl butyrate, vinyl chloroacetate, vinyl maleate, vinyl perfluoroacetate.

(4) Carboxy: maleic acid, maleic anhydride, methyl maleate, ethyl fumarate, methyl itaconate, methyl methacrylate, methylene malonic esters, etc.

(5) Aroyloxy: vinyl benzoate, vinyl toluate, vinyl phthalate.

(6) Alkoxy: vinyl ethyl ether, vinyl isobutyl ether, vinyl 2-hexylethyl ether, vinyl benzyl ether and corresponding thioethers. The corresponding allyl ethers and thioethers may also be used.

(7) Aryloxy: vinyl phenyl ether, vinyl-p-chlorophenyl ether, vinyl xylyl ethers, vinyl cresyl ethers and the corresponding thioethers.

(8) Substituted amino: N-vinyl dimethylamine, N-vinyl morpholine, N-vinyl pyrrolidone, N-vinyl carbazol, N-vinyl phthalimide, divinyl amine.

(9) Nitro: nitroethylene, 2-nitropropylene, nitrobutenes.

(10) Cyano: acrylonitrile, methacrylonitrile, maleonitrile, fumaronitrile and chlorofumaronitrile.

(11) —CH(R)X wherein X is a negative group and R is H or an alkyl group, e. g., methyl: allyl ethers, allyl esters, allyl amines and the corresponding methallyl compounds, e. g., allyl acetate, allyl ethyl ether, allyl phenyl ether, diallyl bis-phenol

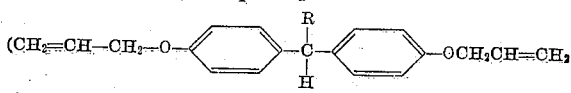

wherein R is an alkyl, usually a methyl, radical) and allyl bis-phenol

wherein R is an alkyl, usually a methyl, radical).

(12) Heterocyclic groups: 2-vinyl furan, 3-vinyl furan, 2-vinyl pyridine, 2-vinyl thiophene.

(13) Acyl: methyl vinyl ketone, methyl isopropenyl ketone, isobutyl vinyl ketone.

(14) Aroyl: vinyl phenyl ketone, vinyl naphthyl ketone, vinyl p-methyl phenyl ketone.

In general, the range of polymerization reaction temperatures employed in the present process varies between about 100° C. and about 300° C. It will be understood that the polymerization temperature selected for use will usually be varied according to the specific aliphatic conjugated diolefin charging stock, the particular metal oxide catalyst and promoters employed, the desired polymerization pressure, the nature and amount of the co-monomer, if any, and the type of products which it is desired to produce in the present process. The optimum polymerization reaction temperature can readily be determined in each specific case by one skilled in the art. In general, increasing the polymerization temperature tends to reduce the average molecular weight and density of the polymer produced in the process. By way of example, in the polymerization of 1,3-butadiene in solution in a liquid aromatic hydrocarbon reaction medium such as benzene, I prefer to employ temperatures between about 150° C. and about 230° C. in the presence of a prereduced catalyst containing a minor proportion of molybdena supported upon a major proportion of a difficultly reducible metal oxide such as gamma-alumina to produce normally solid, elastic polymers.

The process of the present invention can be effected at atmospheric or higher pressures. Very often it is effected under the autogenous pressure of the aliphated conjugated diolefin and the reaction solvent. The upper limit of polymerization pressure may be dictated by economic considerations and equipment limitations and may be 10,000 p. s. i. g., 20,000 p. s. i. g., or even more. When a reaction solvent is employed, the pressure which is used should be sufficient to maintain a liquid phase in the reaction zone.

The contact time or space velocity employed in the polymerization process will be selected with reference to the other process variables, charging stocks, catalysts, the specific type of product desired and the extent of diolefin conversion desired in any given run or pass over the catalyst. In general, this variable is readily adjustable to obtain the desired results. In operations in which the aliphatic conjugated diolefin charging stock is caused to flow continuously into and out of contact with the solid catalyst, suitable liquid hourly space velocities are usually selected between about 0.1 and about 10 volumes, preferably about 0.5 to 5 or about 2 volumes of diolefin solution in a liquid reaction medium, which is usually an aromatic hydrocarbon such as benzene, toluene, xylenes, or tetralin, or a cycloaliphatic hydrocarbon, such as decalin (decahydronaphthalene). The amount of aliphatic conjugated diolefin, e. g. 1,3-butadiene, in such solutions may be in the range of about 2 to 50% by weight, preferably about 10 and about 30 weight percent.

In batch operations, operating periods of between about one-half and about 10 hours, usually between about 1 and about 4 hours, are employed. The autoclave can be recharged with diolefin as it is converted in the polymerization reaction.

The solvent:catalyst weight ratio can be varied in the range of about 5 to about 3000, or even higher for continuous reaction systems. The employment of high solvent:catalyst ratios, which is rendered possible by the presence of alkaline earth metal hydride in the reaction zone, is very important in preventing fouling of the catalyst by resinous reaction products.

Aliphatic conjugated diolefins may be polymerized in the gas phase. Upon completion of the desired polymerization reaction, the solid catalyst is treated for the recovery of the polymerization products therefrom, for example by extraction of the catalyst mixture with suitable solvents.

Various classes of hydrocarbons or their mixtures which are liquid and substantially inert under the polymerization reaction conditions of the present process can be employed as liquid reaction or extraction media. Members of the aromatic hydrocarbon series, particularly the mononuclear aromatic hydrocarbons, viz, benzene, toluene, xylenes, mesitylene and xylene-p-cymene mixtures can be employed. Tetrahydronaphthalene can also be employed. In addition, I may employ such aromatic hydrocarbons as ethylbenzene, isopropylbenzene, n-propylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydro-forming operations as distillates or bottoms, from cycle stock fractions of cracking operations, etc.

I may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, I may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, I may employ straight run naphthas or kerosenes containing alkanes and cycloalkanes. Specifically, I may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

I may also employ a liquid hydrocarbon reaction medium comprising liquid olefins, e. g., n-hexenes, cyclohexene, 1-octene, hexadecenes and the like.

The liquid hydrocarbon reaction medium should be freed of poisons before use in the present invention by acid treatment, e. g., with anhydrous p-toluenesulfonic acid, sulfuric acid, phosphoric acid or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

C. P. xylenes can be purified by refluxing with a mixture of $MoO_3$—$Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the diolefin conversion process can be readily accomplished owing to the presence in the reaction zone of a large liquid mass having relatively high heat capacity. The liquid hydrocarbon reaction medium can be cooled by indirect heat exchange inside or outside the reaction zone.

The process of this invention can be carried out in conventional equipment, e. g., in pressure vessels provided with agitators to effect contacting of the catalyst and promoter particles with the liquid reaction medium and aliphatic conjugated diolefin. For vapor phase operation, fixed or fluidized beds of pelleted or powdered catalyst, respectively, in the reaction towers of conventional design can be used.

The solution of polymers or copolymers can be recovered by conventional techniques. Precipitation of various solid polymers from solution can be induced by addition of various antisolvents (non-solvents), e. g., low-boiling hydrocarbons such as propane, alcohols, ketones, etc. Polymers can also be recovered from solution by fractional distillation techniques or by spray drying.

A solution of solid polymer can be mixed with hot water and superheated steam to effect rapid vaporization of the solvent from the solid polymer. The aqueous slurry of polymer can be concentrated by conventional methods to yield a slurry containing about 10 to 15 weight percent polymer, which can thereafter be centrifuged to yield a polymer containing a minor proportion of water, which can be thoroughly dried in conventional equipment.

The following examples are intended to illustrate but not to limit my invention.

In the following examples the reactor was a stainless steel autoclave provided with a magnetically-actuated stirring mechanism which was reciprocated through the solvent to cause effective contacting of solvent, powdered metal oxide and hydride catalysts, and polymerizable material. The solvent was purified by preliminary treatment with hydrogen-reduced 8 weight percent molybdena-gamma-alumina and $CaH_2$, each used in the proportion of 0.5 g. per 30 cc. of solvent at 230° C. for 2 hours.

*Example 1*

The autoclave was charged with 40 cc. of benzene, purified as above described, 0.5 g. of 8 w. percent molybdena-gamma-alumina (powder, 60 mesh, which had been pre-reduced by treatment with hydrogen at atmospheric pressure and 430° C. flowing over the catalyst at the rate of 5 liters per hour for 16 hours), and 0.5 g. of calcium hydride. The solution was saturated with 1,3-butadiene at room temperature and atmospheric pressure, resulting in a solution containing 22 mol percent 1,3-butadiene in the benzene. The contents of the autoclave were then heated to 250° C. with stirring under autogenous pressure (about 500 p. s. i. g.). A 125 p. s. i. pressure drop was observed. The reactor was then allowed to cool to room temperature, gases were vented, the reactor was opened and a benzene solution of polymer was filtered from solids. The polymer was recovered by precipitation of the benzene solution with an equal volume of methanol, followed by filtration, washing and drying. A solid polybutadiene was produced in the yield of 8 grams, which is to say 16 g. per g. of the solid metal oxide catalyst.

The solid polybutadiene produced by polymerization with calcium hydride and molybdena catalyst was examined by the infra-red spectroscopic technique. It was found that the polymer contained 20% 1,2-linked butadiene units and 80% 1,4-linked butadiene units. Of the 1,4-polybutadiene, 62.5% had the cis-configuration and 37.5% the trans-configuration. This type of polybutadiene polymer is characterized by extreme toughness, resistance to thermal breakdown in use, and utility in the manufacture of heavy duty tires.

It was next demonstrated that the catalytic effect in Example 1 was not illusory. To this end the autoclave was cleaned, recharged with 30 cc. of purified benzene and 2 g. of glass beads. The solvent was saturated with 1,3-butadiene at room temperature and atmospheric pressure and the contents of the autoclave were then heated with stirring to 250° C. under autogenous pressure and maintained under these conditions for 7 hours. Product work-up was effected as described above. This operation yielded 0.4 g. of a solid polybutadiene.

The following experiment shows that the calcium hydride in Example 1 is not causing the polymerization. The reactor was cleaned, charged with 30 cc. of purified benzene and 0.5 g. of calcium hydride. The bomb was saturated with 1,3-butadiene as before and heated at 250° C. for 7 hours with stirring. This operation yielded only 0.3 g. of solid polybutadiene, by effecting product work-up as described above.

The following experiment demonstrates that the 8 w.

percent molybdena-gamma-alumina catalyst produces essentially no better results than thermal polymerization alone. The reactor was cleaned, charged with 40 cc. of purified benzene and 0.5 g. of the reduced 8 w. percent molybdena-gamma-alumina catalyst. The bomb was saturated with 1,3-butadiene as before and maintained at 250° C. for 6 hours under autogenous pressure with stirring. This operation yielded 0.5 g. of solid polybutadiene, as compared with 0.4 g. of solid polybutadiene in the experiment wherein glass beads were employed.

*Example 2*

The process of Example 1 was repeated, but the $CaH_2$ thereof was replaced by an equal weight of $BaH_2$. The operation yielded 7.2 g. of solid polybutadiene per g. of the solid metal oxide catalyst.

*Example 3*

This example shows that the metal oxide catalyst need not be pre-reduced before use in the polymerization process. The reactor was charged with 50 cc. of purified benzene, 0.5 g. calcium hydride and 0.5 g. of unreduced 8 w. percent $MoO_3$-gamma-alumina catalyst. The benzene in the reactor was saturated with 1,3-butadiene at room temperature and about atmospheric pressure. The contents of the reactor were heated with stirring at 250° C. for 7 hours. Polymer separation was effected as in Example 1. The operation yielded 2.8 g. of solid polybutadiene per g. of the metal oxide catalyst.

*Example 4*

The reactor was charged with 20 ml. of purified benzene solvent, 3 g. of pre-reduced 8 w. percent molybdena-gamma-alumina catalyst, 1 g. of calcium hydride and 40 ml. of liquid 1,3-butadiene and heated with stirring to 160° C. under autogenous pressure. After 13 hours, the reactor was allowed to cool to room temperature, gases were vented and the polybutadiene product was worked up as in Example 1. This operation yielded 3 g. of a solid polybutadiene.

In a similar run, wherein the temperature was maintained at 100° C. throughout the run, the yield of solid polybutadiene was 0.2 g.

*Example 5*

The reactor was charged with 15 ml. of purified benzene, 2.5 g. of pre-reduced 8 w. percent molybdena-gamma-alumina catalyst and 1 g. of calcium hydride. The contents of the reactor were heated with stirring to 250° C. under the vapor pressure of the benzene solvent and thereafter 35 ml. of liquid 1,3-butadiene were pumped into the reactor. Then ethylene was forced into the reactor to a partial pressure of 1000 p. s. i. and the initial partial pressure thereof was maintained by repressuring ethylene into the reactor from time to time. The rate of pressure drop was about 100 p. s. i. per hour. The operation was discontinued after 4 hours, although the reaction was not complete. The operation yielded 6.6 g. of a solid polymer having a melt viscosity of $9 \times 10^5$ poises (Dienes and Klemm, J. Appl. Phys. 17, 458–71 (1946)), specific viscosity of 24,400 and density at 24° C. of 0.963. (The specific viscosity is (relative viscosity $-1) \times 10^5$, wherein relative viscosity is the efflux time of a solution of 0.125 g. of solid polymer in 100 cc. of xylenes at 110° C. as compared with the efflux time of an equal volume of the xylenes solvent at the same temperature.) The product was molded into a tough, flexible film having an appearance and feel similar to that of polyethylene; however, infra-red spectroscopic analysis of the polymer showed the presence of double bonds therein, indicating the inclusion of some butadiene units. The $CH_2/CH_3$ was greater than 60.

*Example 6*

The reactor was charged with 30 ml. of reagent grade commercial benzene, 3 g. of pre-reduced 8 w. percent molybdena-gamma-alumina catalyst and 1 g. of calcium hydride. The contents of the reactor were heated with stirring to 250° C. and ethylene was then pressured into the reactor to a partial pressure of 1000 p. s. i., which pressure was maintained by repressuring ethylene into the reactor from time to time. Following the initial introduction of ethylene into the reactor, liquid 1,3-butadiene was pressured into the reactor at the rate of 0.1 ml. per minute. The operation was discontinued after 1.5 hours due to the jamming of the stirrer because of the accumulation of solid polymer in the reactor. This operation yielded 2.6 g. of solid polymer having a melt viscosity of $3.2 \times 10^6$ poises, specific viscosity of 34,500 and $CH_2/CH_3$ of 50. Infra-red spectroscopic analysis of the polymer showed the presence of double bonds therein.

*Example 7*

A butadiene-styrene copolymer was prepared in the same manner as butadiene polymer. The reactor was charged with 30 cc. of purified benzene, 0.5 g. hydrogen-reduced 8 w. percent molybdena-gamma-alumina and 0.5 g. of calcium hydride. Then 10 cc. of commercial styrene was added and the solvent was saturated with butadiene. The reactor was heated to 250° C. with stirring for 7 hours. This operation yielded 9.5 g. of tough, elastic butadiene-styrene polymer whose infra-red spectrum was identical with certain samples of a commercial GR–S polymer. The product copolymer contained 15 w. percent styrene and approximately 15% more 1,2-linked butadiene units than the GR–S samples.

*Example 8*

A butadiene-acrylonitrile copolymer was prepared in the same manner as the butadiene-styrene copolymer. The reactor was charged with 30 cc. of purified benzene, 0.5 g. hydrogen-reduced 8 w. percent molybdena-gamma-alumina and 0.5 g. of calcium hydride. Then 14 cc. of acrylonitrile was added and the reactor and solvent were saturated with butadiene. The reactor was heated to 250° C. with stirring for 7 hours. The product work-up was as described in Example 1. This operation yielded 6.5 g. of a solid, elastic copolymer of butadiene and acrylonitrile.

*Example 9*

The reactor was charged with 30 cc. of purified benzene, 0.5 g. of 8 w. percent molybdena supported on gamma-alumina reduced as in Example 1, and 0.5 g. of calcium hydride. Then 15 cc. of isoprene (99 mol percent purity) containing 0.06 weight percent t-butyl catechol as an oxidation inhibitor were added to the reactor. The contents of the reactor were heated with stirring to 250° C. under autogenous pressure (490 p. s. i. g.) and maintained under these conditions for 7 hours. Product work-up was as in Example 1. This operation yielded 8.1 g., or 16.2 g. per g. of solid molybdena catalyst, of a gummy, benzene-soluble polyisoprene.

*Example 10*

The process of Example 1 was repeated, but the molybdena catalyst was replaced by an equal weight of 20 w. percent $WO_3$ supported on zirconia gel, which was reduced before use with hydrogen at 490° C. The operation yielded 10.2 g. of solid polybutadiene per g. of tungstia-zirconia catalyst.

*Example 11*

The process of Example 1 was repeated, but the molybdena catalyst was replaced by an equal weight of a hydrogen-pre-reduced (490° C.) 10 w. percent $Cr_2O_3$ supported on a gamma-alumina gel. This operation yielded 3.6 g. of solid polybutadiene per g. of chromia-alumina catalyst.

Example 12

A polymer of vinyl acetate was prepared by charging the reactor with 50 cc. of purified benzene, 0.5 g. hydrogen-reduced 8 w. percent molybdena-gamma alumina and 0.5 g. of calcium hydride. Then 20 cc. of purified vinyl acetate was added and the reactor was heated with stirring at 250° C. for 7 hours. This operation yielded 10 g. of hard, solid polyvinyl acetate. This sample of polyvinyl acetate was compatible in the usual proportions with conventional plasticizers for polyvinyl acetate.

Example 13

Acrylonitrile was polymerized in the same manner as was butadiene. The reactor was charged with 30 cc. of purified benzene, 0.5 g. hydrogen-reduced 8 w. percent molybdena-gamma-alumina and 0.5 g. of calcium hydride. Then 14 cc. of commercial acrylonitrile were added to the reactor, which was thereupon heated to 250° C. with stirring, for 10 hours. This operation yielded 2 g. of benzene-insoluble polyacrylonitrile.

Example 14

The reactor was charged with 40 cc. of benzene, 0.5 g. catalyst, 0.5 g. calcium hydride and 15 cc. of acrylonitrile. The reactor was then heated at 250° C. with stirring, for 6 hours. A 50 p. s. i. g. pressure drop was observed. This operation yielded 4 g. of benzene-insoluble polyacrylonitrile. An attempt to polymerize acrylontrile over glass beads in a manner strictly analogous to that employed with butadiene did not yield any polyacrylonitrile. Thus, the polymerization of acrylonitrile requires the presence of catalysts. The polyacrylonitrile as prepared above was a very hard polymer.

The polymers and copolymers produced by the process of the present invention, particularly polymeric materials containing a plurality of tertiary hydrogen atoms, may be converted to the so-called graft polymers. Thus, for example, a polymer or copolymer containing a plurality of tertiary hydrogen atoms is per-oxidized by treatment with air or oxygen and heavy metal salt catalysts or heavy metal oxides, for example a cobalt oxide, to produce the corresponding tertiary polyhydroperoxides. The peroxidized polymeric material is then allowed to react with suitable olefinic materials, for example ethylene, ethylene oxide, acrylonitrile, vinyl chloride, styrene, butadiene, 4-methyl-1,3-pentadiene, tetrafluoroethylene, chlorotrifluoroethylene, etc. The last-mentioned polymerization operation can be carried out by employment of the usual emulsion polymerization techniques, employing those conditions best suited for the reagents being employed in the specific graft co-polymerization. Thus, when a graft polymer is made with a peroxidized butadiene-ethylene copolymer and styrene, the emulsion polymerization may be carried out at temperatures between about 25° C. and about 100° C. under a pressure of 1000 p. s. i. g. or less, with or without an added catalyst, e. g., with one of the large variety of peroxide catalysts which has been used in styrene polymerization, especially cumene hydroperoxide and di-tert-butyl peroxide.

The various polymers and copolymers which can be produced by the process of the present invention are applicable for use in the plastics, resins, synthetic rubber, synthetic adhesives and related arts.

Having thus described my invention, what I claim is:

1. A process for polymerizing an aliphatic conjugated diolefin, which process comprises contacting said aliphatic conjugated diolefin in the presence of a liquid hydrocarbon reaction medium with catalytically effective amounts of the hydride of an alkaline earth metal and an oxide of a metal of group 6a of the Mendeleef periodic table, the ratio of said hydride to metal oxide catalyst being between about 0.1 and about 5 by weight, at a polymerization reaction temperature between about 100° C. and about 300° C. under a pressure sufficient to maintain a liquid phase, for a period of time sufficient to effect substantial polymerization of said aliphatic conjugated diolefin, and separating a polymer thus produced.

2. The process of claim 1 wherein said diolefin is 1,3-butadiene.

3. The process of claim 1 wherein said diolefin is isoprene.

4. The process of claim 1 wherein said diolefin is 1,3-butadiene, said hydride is a calcium hydride and said oxide is a minor proportion of molybdena dispersed upon a major proportion of a difficulty reducible metal oxide.

5. The process of claim 1 wherein said diolefin is 1,3-butadiene, said hydride is barium hydride and said oxide is a minor proportion of molybdena dispersed upon a major proportion of a difficultly reducible metal oxide.

6. The process of claim 1 wherein said oxide is chromia.

7. The process of claim 1 wherein said oxide is tungstia.

8. A process which comprises contacting an aliphatic conjugated diolefin and a compound co-polymerizable therewith with catalytically effective amounts of the hydride of an alkaline earth metal and an oxide of a metal of group 6a of the Mendeleef periodic table, the ratio of said hydride to metal oxide catalyst being between about 0.1 and about 5 by weight, at a reaction temperature between about 100° C. and about 300° C., for a period of time sufficient to effect substantial copolymerization, and separating a polymeric material thus produced.

9. The process of claim 8 which comprises effecting said contacting in the presence of a liquid hydrocarbon reaction medium.

10. The process of claim 9 wherein said compound is styrene.

11. The process of claim 9 wherein said compound is ethylene.

12. The process of claim 9 wherein said compound is acrylonitrile.

13. A process for polymerizing an aliphatic conjugated diolefin, which process comprises contacting said diolefin in the presence of an inert liquid reaction medium with catalytically effective amounts of the hydride of an alkaline earth metal and a metal oxide catalyst comprising partially reduced oxide of a metal of group 6a of the Mendeleef periodic table, said metal in said partially reduced oxide having a positive valence between 2 and 5.5, said partially reduced oxide being supported upon a difficultly reducible metal oxide, the ratio of said hydride to said metal oxide catalyst being between about 0.1 and about 5 by weight, effecting said contacting at a polymerization reaction temperature between about 100° C. and about 300° C. under a pressure sufficient to maintain a liquid phase, for a period of time sufficient to effect substantial polymerization of said aliphatic conjugated diolefin, and separating a polymer thus produced.

14. A process for the polymerization of 1,3-butadiene, which process comprises contacting said butadiene in the presence of a liquid hydrocarbon reaction medium with catalytically effective amounts of calcium hydride and a catalyst comprising essentially a minor proportion of a pre-reduced molybdenum trioxide dispersed upon a major proportion of a difficultly reducible metal oxide, the ratio of said calcium hydride to said metal oxide catalyst being between about 0.1 and about 5, at a polymerization reaction temperature between about 100° C. and about 300° C. under a pressure sufficient to maintain a liquid phase, for a period of time sufficient to effect substantial polymerization of 1,3-butadiene and separating a normally solid polymer of 1,3-butadiene thus produced.

15. The process of claim 14 wherein said liquid hydrocarbon reaction medium is an aromatic hydrocarbon.

No references cited.